US007227865B2

(12) United States Patent
Shaheen et al.

(10) Patent No.: US 7,227,865 B2
(45) Date of Patent: Jun. 5, 2007

(54) UTILIZING SESSION INITIATION PROTOCOL FOR IDENTIFYING USER EQUIPMENT RESOURCE RESERVATION SETUP PROTOCOL CAPABILITIES

(75) Inventors: Kamel Shaheen, King of Prussia, PA (US); Brian Kiernan, Voorhees, NJ (US)

(73) Assignee: Interdigital Technology Corporation, Wilmington, DE (US)

( * ) Notice: Subject to any disclaimer, the term of this patent is extended or adjusted under 35 U.S.C. 154(b) by 1052 days.

(21) Appl. No.: 10/217,692

(22) Filed: Aug. 13, 2002

(65) Prior Publication Data

US 2003/0035401 A1 Feb. 20, 2003

Related U.S. Application Data

(60) Provisional application No. 60/312,918, filed on Aug. 16, 2001, provisional application No. 60/312,920, filed on Aug. 16, 2001.

(51) Int. Cl.
*H04L 12/28* (2006.01)
*H04L 12/56* (2006.01)
*H04Q 7/24* (2006.01)

(52) U.S. Cl. ............... 370/395.21; 370/392; 370/230; 370/338

(58) Field of Classification Search ............... 370/338
See application file for complete search history.

(56) References Cited

U.S. PATENT DOCUMENTS 6,021,263 A    2/2000  Kujoory et al.

(Continued)

FOREIGN PATENT DOCUMENTS

EP           1 120 939           8/2001

(Continued)

OTHER PUBLICATIONS

InterDigital Communication: "RSVP support in UMTS Core Network" TSG-SA WG2 IMS key issues S2-012249—Sophia, France, Aug. 27-29, 2001.

(Continued)

*Primary Examiner*—Chi Pham
*Assistant Examiner*—Ronald Abelson
(74) *Attorney, Agent, or Firm*—Volpe and Koenig, P.C.

(57) ABSTRACT

In a communication between a mobile unit (UE) and a gateway general packet radio system (GGRS) support node (GGSN) wherein resource reservations setup protocol (RSVP) capabilities are shared therebetween by a session setup mechanism, preferably session initiation protocol (SIP) in which RSVP capabilities of the UE and GGSN are defined and exchanged. In addition, the SIP is utilized to identify the preferred RSVP mode of operation by negotiations. The SIP is utilized to indicate that: the UE is RSVP capable; those media flows which are based on RSVP; the preferred mode of operation i.e. either UE based RSVP signaling or GGSN proxy based RSVP signaling and to communication a final setup mode for RSVP signaling to the UE from policy control function (PCF). The SIP may also be employed to enable the UE and network to indicate intended quality of service (QoS) protocol during a call setup procedure. The SIP is further utilized to enable the terminating UE and/or network to indicate in their response the capability of supporting a particular QoS protocol, the call being rejected with a clear indication of the cause when the terminating network is not capable of supporting the proposed QoS protocol.

21 Claims, 19 Drawing Sheets

U.S. PATENT DOCUMENTS

| | | | |
|---|---|---|---|
| 6,058,113 | A | 5/2000 | Chang |
| 6,101,549 | A | 8/2000 | Baugher et al. |
| 6,252,857 | B1 | 6/2001 | Fendick et al. |
| 6,366,577 | B1 | 4/2002 | Donovan |
| 6,434,143 | B1 | 8/2002 | Donovan |
| 6,438,114 | B1 | 8/2002 | Womack et al. |
| 6,487,595 | B1 | 11/2002 | Turunen et al. |
| 6,496,479 | B1 * | 12/2002 | Shionozaki ............ 370/230 |
| 2002/0119821 | A1 * | 8/2002 | Sen et al. ............ 463/42 |

FOREIGN PATENT DOCUMENTS

| | | |
|---|---|---|
| WO | 01/28160 | 4/2001 |
| WO | 01/35680 | 5/2001 |

OTHER PUBLICATIONS

InterDigital Communication: "Admission Control Based on Support of RSVP based QoS" 3GPP Change Request; TSG-SA2 IMS Key issue Meeting S2-012250—Sophia, France, Aug. 27-30, 2001.

ETSI TS 123 207 V5.3.0 Universal Mobile Telecommunications System (UMTS); End to end quality of service concept and architecture (3GPP TS 23.207 version 5.3.0 Release 5).

Schulzrinne H. et al. "Interaction of Call Setup and Resource Reservation Protocols in Internet Telephony", White Paper, Jun. 15, 1999, pp. 1-15.

* cited by examiner

```
INVITE sip:+1-212-555-2222@home.net;user=phone SIP/2.0
Via: SIP/2.0/UDP [5555::aaa:bbb:ccc:ddd]
Supported: 100rel
Remote-Party-ID: "John Doe" <tel:+1-212-555-1111>;privacy=off
Proxy-Require; privacy
Anonymity: Off
From: "Alien Blaster" <sip:B36(SHA-1(+1-212-555-1111; time=36123E5B;
 seq=72))@localhost>; tag=171828
To: sip:B36(SHA-1(+1-212-555-2222; time=36123E5B; seq=73))@localhost
Call-ID: B36(SHA-1(555-1111;time=36123E5B;seq=72))@localhost
Cseq: 127 INVITE
Contact: sip: [5555::aaa:bbb:ccc:ddd]
Content-Type: application/sdp
Content-length: (...)

v=0
o=- 2987933615 2987933615 IN IP6 5555::aaa:bbb:ccc:ddd
s=-
c= IN IP6 5555::aaa:bbb:ccc:ddd
b=AS:64
t=907165275 0
m=video 3400 RTP/AVP 98 99
a=qos:mandatory sendrecv
a=rtpmap:98 H261
a=rtpmap:99:MPV
m=video 3402 RTP/AVP 98 99
a=rtpmap: 98 H261
a=rtpmap: 99:MPV
a=qos:mandatory sendrecv
m=audio 3458 RTP/AVP 97 96 0 15
a=rtpmap: 97 AMR
a=fmtp: 97 mode-set=0,2,5,7; maxframes=2
a=rtpmap: 96 G726-32/8000
a=qos:mandatory sendrecv
m=audio 3458 RTP/AVP 97 96 0 15
a=rtpmap: 97 AMR
a=fmtp:97 mode-set=0,2,5,7; maxframes=2
a=rtpmap: 96 G726-32/8000
a=qos:mandatory sendrecv
```

*FIG. 3*

INVITE sip:+1-212-555-2222@home.net;user=phone SIP/2.0
Via: SIP/2.0/UDP [5555::aaa:bbb:ccc:ddd]
Supported: 100rel
Remote-Party-ID: "John Doe" <tel:+1-212-555-1111>;privacy=off
Proxy-Require; privacy
Anonymity: Off
From: "Alien Blaster" <sip:B36(SHA-1(+1-212-555-1111; time=36123E5B;
 seq=72))@localhost>; tag=171828
To: sip:B36(SHA-1(+1-212-555-2222; time=36123E5B; seq=73))@localhost
Call-ID: B36(SHA-1(555-1111;time=36123E5B;seq=72))@localhost
Cseq: 127 INVITE
Contact: sip: [5555::aaa:bbb:ccc:ddd]
Content-Type: application/sdp
Content-length: (...)

v=0
o=- 2987933615 2987933615 IN IP6 5555::aaa:bbb:ccc:ddd
s=-
c= IN IP6 5555::aaa:bbb:ccc:ddd
b=AS:64
t=907165275 0 ⟵ 19
pc=RSVP capable RSVP Proxy Prefered ⟵ 20
m=video 3400 RTP/AVP 98 99
I  a=qos:mandatory sendrecv; RSVP ⟵ 22
   a=rtpmap:98 H261
   a=rtpmap:99:MPV
   m=video 3402 RTP/AVP 98 99
   a=rtpmap: 98 H261
   a=rtpmap: 99:MPV
III a=qos:mandatory sendrecv; RSVP ⟵ 24
   m=audio 3456 RTP/AVP 97 96 0 15
   a=rtpmap: 97 AMR
   a=fmtp: 97 mode-set=0,2,5,7; maxframes=2
   a=rtpmap: 96 G726-32/8000
III a=qos:mandatory sendrecv; RSVP ⟵ 26
   m=audio 3458 RTP/AVP 97 96 0 15
IV a=rtpmap: 97 AMR
   a=fmtp:97 mode-set=0,2,5,7; maxframes=2
   a=rtpmap: 96 G726-32/8000
   a=qos:mandatory sendrecv DiffServ ⟵ 28

*FIG. 5*

SIP/2.0 183 Session Progress
Via: SIP/2.0/UDP scscf.home.net, SIP/2.0/UDP pcscf1.visited.net, SIP/2.0/UDP [5555::aaa:bbb:ccc:ddd]
Record-Route: sip:scscf2.home.net, sip:scscf.home.net
Remote-Party-ID: "John Smith" <tel:+1-212-555-2222>; privacy=off; screen=yes
Anonymity: Off
Require: 100rel
From:
To: sip:B36(SHA-1(+1-212-555-2222; time=36123E5B; seq=73))@ localhost; tag=314159
Call-ID:
Cseq:
Contact: sip: %5b5555%3a%3aeee%3afff%3aaaa%3abbb%5d@ pcscf2.home.net
RSeq: 9021
Content-Disposition: precondition
Content-Type: application/sdp
Content-length: (...)

v=0
o=- 2987933615 2987933615 IN IP6 5555::aaa:bbb:ccc:ddd
s=-
30 c= IN IP6 5555::eee:fff:aaa:bbb
b=AS:64
t=907165275 0 ───32
pc=RSVP capable RSVP Proxy Not Prefered
m=video 0 RTP/AVP 99
m=video 0 RTP/AVP 99
m=audio 6544 RTP/AVP 97 96
a=rtpmap: 97 AMR
a=fmtp: 97 mode-set=0,2,5,7; maxframes=2
a=rtpmap: 96 G726-32/8000 ───34
a=qos:mandatory sendrecv confirm RSVP
m=audio 0 RTP/AVP 97 96 0 15

*FIG. 6*

SIP/2.0 183 Session Progress
Via: SIP/2.0/UDP scscf.home.net, SIP/2.0/UDP pcscf1.visited.net, SIP/2.0/UDP [5555::aaa:bbb:ccc:ddd]
Record-Route: sip:scscf2.home.net, sip:scscf.home.net
Remote-Party-ID: "John Smith" <tel:+1-212-555-2222>; privacy=off; screen=yes
Anonymity: Off
Require: 100rel
From:
To: sip:B36(SHA-1(+1-212-555-2222; time=36123E5B; seq=73))@ localhost; tag=314159
Call-ID:
Cseq:
Contact: sip: %5b5555%3a%3aeee%3afff%3aaaa%3abbb%5d@ pcscf2.home.net
RSeq: 9021
Content-Disposition: precondition
Content-Type: application/sdp
Content-length: (...)

v=0
o=- 2987933615 2987933615 IN IP6 5555::aaa:bbb:ccc:ddd
s=-
c= IN IP6 5555::eee:fff:aaa:bbb
b=AS:64
t=907165275 0
pc=Stop-RSVP: RSVP Signaling ← 36
m=video 0 RTP/AVP 99
m=video 0 RTP/AVP 99
m=audio 6544 RTP/AVP 97 96
a=rtpmap: 97 AMR
a=fmtp: 97 mode-set=0,2,5,7; maxframes=2
a=rtpmap: 96 G726-32/8000
a=qos:mandatory sendrecv confirm RSVP ← 38
m=audio 0 RTP/AVP 97 96 0 15

*FIG. 7*

RSVP capabilities and Proxy configuration rc= RSVP Capability-tag proxy-tag

[PConfig-tag]

RSVP Capability-tag = ("RSVP Capable" "notRSVP Capable")

proxy-tag ("RSVP Proxy Prefered" "RSVP Proxy Not Prefered")

Pconfig-tag=("Continue-RSVP Signaling" "Stop RSVP Signaling)

Qos -attributes = "a=qos:" strength-tag SP direction-tag Reservation=protocol-tag

[SP confirmation-tag]

| | |
|---|---|
| Strength-tag | = ("mandatory" \| "Optional" \| "success" \| "Failure") |
| Direction-tag | = ("send" \| :recv" \| "sendrecv") |
| Confirmation-tag | = "confirm" |

Reservation Protocol-tag = ( "RSVP" "DiffServ" ) —42

FIG. 10

INVITE sip:+1-212-555-2222@home.net;user=phone SIP/2.0
Via: SIP/2.0/UDP [5555::aaa:bbb:ccc:ddd]
Supported: 100rel
Remote-Party-ID: "John Doe" <tel:+1-212-555-1111>;privacy=off
Proxy-Require; privacy
Anonymity: Off
From: "Alien Blaster" <sip:B36(SHA-1(+1-212-555-1111; time=36123E5B;
  seq=72))@localhost>; tag=171828
To: sip:B36(SHA-1(+1-212-555-2222; time=36123E5B; seq=73))@localhost
Call-ID: B36(SHA-1(555-1111;time=36123E5B;seq=72))@localhost
Cseq: 127 INVITE
Contact: sip: [5555::aaa:bbb:ccc:ddd]
Content-Type: application/sdp
Content-length: (...)

v=0
o=- 2987933615 2987933615 IN IP6 5555::aaa:bbb:ccc:ddd
s=-
c= IN IP6 5555::aaa:bbb:ccc:ddd
b=AS:64
t=907165275 0
rc=RSVP capable RSVP Proxy Preferred ─── 48
m=video 3400 RTP/AVP 98 99
a=qos:mandatory sendrecv; RSVP
a=rtpmap:98 H261                            ⎬ 44
a=rtpmap:99:MPV
m=video 3402 RTP/AVP 98 99
a=rtpmap: 98 H261
a=rtpmap: 99:MPV
a=qos:mandatory sendrecv RSVP
m=audio 3456 RTP/AVP 97 96 0 15
a=rtpmap: 97 AMR
a=fmtp: 97 mode-set=0,2,5,7; maxframes=2    ⎬ 46
a=rtpmap: 96 G726-32/8000
a=qos:mandatory sendrecv RSVP
m=audio 3458 RTP/AVP 97 96 0 15
a=rtpmap: 97 AMR
a=fmtp:97 mode-set=0,2,5,7; maxframes=2
a=rtpmap: 96 G726-32/8000
a=qos:mandatory sendrecv DiffServ

*FIG. 11*

INVITE sip:+1-212-555-2222@home.net;user=phone SIP/2.0
Via: SIP/2.0/UDP [5555::aaa:bbb:ccc:ddd]
Supported: 100rel
Remote-Party-ID: "John Doe" <tel:+1-212-555-1111>;privacy=off
Proxy-Require; privacy
Anonymity: Off
From: "Alien Blaster" <sip:B36(SHA-1(+1-212-555-1111; time=36123E5B;
   seq=72))@localhost>; tag=171828
To: sip:B36(SHA-1(+1-212-555-2222; time=36123E5B; seq=73))@localhost
Call-ID: B36(SHA-1(555-1111;time=36123E5B;seq=72))@localhost
Cseq: 127 INVITE
Contact: sip: [5555::aaa:bbb:ccc:ddd]
Content-Type: application/sdp
Content-length: (...)

v=0
o=- 2987933615 2987933615 IN IP6 5555::aaa:bbb:ccc:ddd
s=-
c= IN IP6 5555::aaa:bbb:ccc:ddd
b=AS:64
t=907165275 0
m=video 3400 RTP/AVP 98 99
a=qos:mandatory sendrecv; RSVP
a=rtpmap:98 H261
a=rtpmap:99:MPV
m=video 3402 RTP/AVP 98 99
a=rtpmap: 98 H261
a=rtpmap: 99:MPV
a=qos:mandatory sendrecv RSVP
m=audio 3456 RTP/AVP 97 96 0 15
a=rtpmap: 97 AMR
a=fmtp: 97 mode-set=0,2,5,7; maxframes=2
a=rtpmap: 96 G726-32/8000
a=qos:mandatory sendrecv RSVP
m=audio 3458 RTP/AVP 97 96 0 15
a=rtpmap: 97 AMR
a=fmtp:97 mode-set=0,2,5,7; maxframes=2
a=rtpmap: 96 G726-32/8000
a=qos:mandatory sendrecv DiffServ

*FIG. 12*

SIP/2.0 183 Session Progress
Via: SIP/2.0/UDP scscf.home.net, SIP/2.0/UDP pcscf1.visited.net, SIP/2.0/UDP [5555::aaa:bbb:ccc:ddd]
Record-Route: sip:scscf2.home.net, sip:scscf.home.net
Remote-Party-ID: "John Smith" <tel:+1-212-555-2222>; privacy=off; screen=yes
Anonymity: Off
Require: 100rel
From:
To: sip:B36(SHA-1(+1-212-555-2222; time=36123E5B; seq=73))@ localhost; tag=314159
Call-ID:
Cseq:
Contact: sip: %5b5555%3a%3aeee%3afff%3aaaa%3abbb%5d@ pcscf2.home.net
RSeq: 9021
Content-Disposition: precondition
Content-Type: application/sdp
Content-length: (...)

v=0
o=- 2987933615 2987933615 IN IP6 5555::aaa:bbb:ccc:ddd
s=-
c= IN IP6 5555::eee:fff:aaa:bbb
b=AS:64
t=907165275 0
rc=RSVP capable RSVP Proxy Not Prefered — 50
m=video 0 RTP/AVP 99
m=video 0 RTP/AVP 99
m=audio 6544 RTP/AVP 97 96
a=rtpmap: 97 AMR
a=fmtp: 97 mode-set=0,2,5,7; maxframes=2
a=rtpmap: 96 G726-32/8000
a=qos:mandatory sendrecv confirm RSVP
m=audio 0 RTP/AVP 97 96 0 15

*FIG. 13*

SIP/2.0 183 Session Progress
Via: SIP/2.0/UDP scscf.home.net, SIP/2.0/UDP pcscf1.visited.net, SIP/2.0/UDP [5555::aaa:bbb:ccc:ddd]
Record-Route: sip:scscf2.home.net, sip:scscf.home.net
Remote-Party-ID: "John Smith" <tel:+1-212-555-2222>; privacy=off; screen=yes
Anonymity: Off
Require: 100rel
From:
To: sip:B36(SHA-1(+1-212-555-2222; time=36123E5B; seq=73))@ localhost; tag=314159
Call-ID:
Cseq:
Contact: sip: %5b5555%3a%3aeee%3afff%3aaaa%3abbb%5d@ pcscf2.home.net
RSeq: 9021
Content-Disposition: precondition
Content-Type: application/sdp
Content-length: (...)

v=0
o=- 2987933615 2987933615 IN IP6 5555::aaa:bbb:ccc:ddd
s=-
c= IN IP6 5555::eee:fff:aaa:bbb
b=AS:64
t=907165275 0
rc=RSVP capable
m=video 0 RTP/AVP 99
m=video 0 RTP/AVP 99
m=audio 6544 RTP/AVP 97 96
a=rtpmap: 97 AMR
a=fmtp: 97 mode-set=0,2,5,7; maxframes=2
a=rtpmap: 96 G726-32/8000
a=qos:mandatory sendrecv confirm RSVP
m=audio 0 RTP/AVP 97 96 0 15

*FIG. 14*

SIP/2.0 183 Session Progress
Via: SIP/2.0/UDP scscf.home.net, SIP/2.0/UDP pcscf1.visited.net, SIP/2.0/UDP [5555::aaa:bbb:ccc:ddd]
Record-Route: sip:scscf2.home.net, sip:scscf.home.net
Remote-Party-ID: "John Smith" <tel:+1-212-555-2222>; privacy=off; screen=yes
Anonymity: Off
Require: 100rel
From:
To: sip:B36(SHA-1(+1-212-555-2222; time=36123E5B; seq=73))@localhost; tag=314159
Call-ID:
Cseq:
Contact: sip: %5b5555%3a%3aeee%3afff%3aaaa%3abbb%5d@pcscf2.home.net
RSeq: 9021
Content-Disposition: precondition
Content-Type: application/sdp
Content-length: (...)

v=0
o=- 2987933615 2987933615 IN IP6 5555::aaa:bbb:ccc:ddd
s=-
c= IN IP6 5555::eee:fff:aaa:bbb
b=AS:64
t=907165275 0
rc= Not RSVP capable - RSVP Proxy Preferred ⎯⎯⎯ 50
m=video 0 RTP/AVP 99
m=video 0 RTP/AVP 99
m=audio 6544 RTP/AVP 97 96
a=rtpmap: 97 AMR
a=fmtp: 97 mode-set=0,2,5,7; maxframes=2
a=rtpmap: 96 G726-32/8000
a=qos:mandatory sendrecv confirm RSVP
m=audio 0 RTP/AVP 97 96 0 15

*FIG. 15*

SIP/2.0 183 Session Progress
Via: SIP/2.0/UDP scscf.home.net, SIP/2.0/UDP pcscf1.visited.net, SIP/2.0/UDP [5555::aaa:bbb:ccc:ddd]
Record-Route: sip:scscf2.home.net, sip:scscf.home.net
Remote-Party-ID: "John Smith" <tel:+1-212-555-2222>; privacy=off; screen=yes
Anonymity: Off
Require: 100rel
From:
To: sip:B36(SHA-1(+1-212-555-2222; time=36123E5B; seq=73))@localhost; tag=314159
Call-ID:
Cseq:
Contact: sip: %5b5555%3a%3aeee%3afff%3aaaa%3abbb%5d@pcscf2.home.net
RSeq: 9021
Content-Disposition: precondition
Content-Type: application/sdp
Content-length: (...)

v=0
o=- 2987933615 2987933615 IN IP6 5555::aaa:bbb:ccc:ddd
s=-
c= IN IP6 5555::eee:fff:aaa:bbb
b=AS:64
t=907165275 0
rc= RSVP capable ⎯⎯ 52
m=video 0 RTP/AVP 99
m=video 0 RTP/AVP 99
m=audio 6544 RTP/AVP 97 96
a=rtpmap: 97 AMR
a=fmtp: 97 mode-set=0,2,5,7; maxframes=2
a=rtpmap: 96 G726-32/8000
a=qos:mandatory sendrecv confirm RSVP
m=audio 0 RTP/AVP 97 96 0 15

*FIG. 16*

SIP/2.0 183 Session Progress
Via: SIP/2.0/UDP scscf.home.net, SIP/2.0/UDP pcscf1.visited.net, SIP/2.0/UDP [5555::aaa:bbb:ccc:ddd]
Record-Route: sip:scscf2.home.net, sip:scscf.home.net
Remote-Party-ID: "John Smith" <tel:+1-212-555-2222>; privacy=off; screen=yes
Anonymity: Off
Require: 100rel
From:
To: sip:B36(SHA-1(+1-212-555-2222; time=36123E5B; seq=73))@localhost; tag=314159
Call-ID:
Cseq:
Contact: sip: %5b5555%3a%3aeee%3afff%3aaaa%3abbb%5d@pcscf2.home.net
RSeq: 9021
Content-Disposition: precondition
Content-Type: application/sdp
Content-length: (...)                    ──54
| rc= Not RSVP capable |
v=0
o=- 2987933615 2987933615 IN IP6 5555::aaa:bbb:ccc:ddd
s=-
c= IN IP6 5555::eee:fff:aaa:bbb
b=AS:64
t=907165275 0
m=video 0 RTP/AVP 99
m=video 0 RTP/AVP 99
m=audio 6544 RTP/AVP 97 96
a=rtpmap: 97 AMR
a=fmtp: 97 mode-set=0,2,5,7; maxframes=2
a=rtpmap: 96 G726-32/8000
a=qos:mandatory sendrecv confirm |DiffServ|
m=audio 0 RTP/AVP 97 96 0 15

*FIG. 17*

SIP/2.0 183 Session Progress
Via: SIP/2.0/UDP scscf.home.net, SIP/2.0/UDP pcscf1.visited.net, SIP/2.0/UDP [5555::aaa:bbb:ccc:ddd]
Record-Route: sip:scscf2.home.net, sip:scscf.home.net
Remote-Party-ID: "John Smith" <tel:+1-212-555-2222>; privacy=off; screen=yes
Anonymity: Off
Require: 100rel
From:
To: sip:B36(SHA-1(+1-212-555-2222; time=36123E5B; seq=73))@ localhost; tag=314159
Call-ID:
Cseq:
Contact: sip: %5b5555%3a%3aeee%3afff%3aaaa%3abbb%5d@ pcscf2.home.net
RSeq: 9021
Content-Disposition: precondition
Content-Type: application/sdp
Content-length: (...)

v=0
o=- 2987933615 2987933615 IN IP6 5555::aaa:bbb:ccc:ddd
s=-
c= IN IP6 5555::eee:fff:aaa:bbb
b=AS:64
t=907165275 0 ──────58
rc= RSVP capable Stop RSVP Signaling ─────56
m=video 0 RTP/AVP 99
m=video 0 RTP/AVP 99
m=audio 6544 RTP/AVP 97 96
a=rtpmap: 97 AMR
a=fmtp: 97 mode-set=0,2,5,7; maxframes=2
a=rtpmap: 96 G726-32/8000
a=qos:mandatory sendrecv confirm RSVP
m=audio 0 RTP/AVP 97 96 0 15

*FIG. 18*

SIP/2.0 183 Session Progress
Via: SIP/2.0/UDP scscf.home.net, SIP/2.0/UDP pcscf1.visited.net, SIP/2.0/UDP [5555::aaa:bbb:ccc:ddd]
Record-Route: sip:scscf2.home.net, sip:scscf.home.net
Remote-Party-ID: "John Smith" <tel:+1-212-555-2222>; privacy=off; screen=yes
Anonymity: Off
Require: 100rel
From:
To: sip:B36(SHA-1(+1-212-555-2222; time=36123E5B; seq=73))@ localhost; tag=314159
Call-ID:
Cseq:
Contact: sip: %5b5555%3a%3aeee%3afff%3aaaa%3abbb%5d@ pcscf2.home.net
RSeq: 9021
Content-Disposition: precondition
Content-Type: application/sdp
Content-length: (...)

v=0
o=- 2987933615 2987933615 IN IP6 5555::aaa:bbb:ccc:ddd
s=-
c= IN IP6 5555::eee:fff:aaa:bbb
b=AS:64
t=907165275 0
rc= Not RSVP capable Stop RSVP Signaling
m=video 0 RTP/AVP 99
m=video 0 RTP/AVP 99
m=audio 6544 RTP/AVP 97 96
a=rtpmap: 97 AMR
a=fmtp: 97 mode-set=0,2,5,7; maxframes=2
a=rtpmap: 96 G726-32/8000
a=qos:mandatory sendrecv confirm DiffServ
m=audio 0 RTP/AVP 97 96 0 15

*FIG. 19*

UTILIZING SESSION INITIATION PROTOCOL FOR IDENTIFYING USER EQUIPMENT RESOURCE RESERVATION SETUP PROTOCOL CAPABILITIES

This application claims priority from U.S. provisional applications No. 60/312,918 filed Aug. 16, 2001 and No. 60/312,920 filed Aug. 16, 2001, which are incorporated by reference as if fully set forth.

BACKGROUND

The present invention relates to communications between a mobile unit and a general packet radio service (GPRS) gateway support node (GGSN). More particularly, the present invention relates to the employment of session initiation protocol (SIP) for establishing the proper resource reservation protocol RSVP capabilities and requirements as a prerequisite to establishing a communication using RSVP and further establishing quality of service (QoS) capabilities of the UE and GGSN to insure the desired quality of service (QoS).

Currently, the third generation partnership project protocol (3GPP) standards allow for the optional support of resource reservation setup protocol (RSVP) in the user equipment (UE) and in the GGSN as signaling protocol to ensure quality of service. Current standards provide a separation between call setup procedures and establishment of QoS. For example, a UE having RSVP-capability may initiate a call (session) to a non-RSVP capable UE operating in a non-capable RSVP network. The lengthy call establishment procedures will successfully take place but without any indication of the intended protocol to be used for QoS. Upon establishment of the call, the RSVP capable UE will start sending RSVP signaling messages in order to reserve resources that are necessary to carry the media stream along the route to the terminating end. These RSVP messages will be carried across the Internet, only to find a non-capable UE and a non-capable GGSN to complete the reservation procedures. The lack of response from the terminating side to the originator of the RSVP signaling will result in expirations of the resources allocated to this particular media stream at both sides during the call establishment stage, resulting in a dropping of the session and a billing for service that could not have been offered. This inefficient use of system resources reduces overall system capacity and efficiency due to the fact that such a scenario would be persistent in call (session) setups between capable and non-capable RSVP networks and UE. In addition, current technology provides optional support for resource reservation protocol (RSVP) in both user equipment (UE) and universal mobile telecommunication services (UMTS) core network GGSN. As a result, neither the UE nor the GGSN can make any assumptions regarding the support of such protocol except for that it is not applicable, i.e., NA is a default mode of operation. It is therefore important to provide a mechanism to enable an RSVP-capable UE and an RSVP-capable GGSN to inform one another of their RSVP capabilities before any communications can take place using RSVP.

SUMMARY

The present invention discloses a method by which RSVP capabilities of a UE and a GGSN are defined and exchanged. The invention provides a mechanism by way of indications and responses to negotiate preferred RSVP mode of operation employing session initiation protocol (SIP).

The SIP is employed to indicate: the RSVP capability of the UE; that media flow (those media flows) which is (are) based on RSVP; the preferred mode of operation, i.e. either UE-based RSVP signaling or GGSN proxy-based RSVP signaling; and communication of the final setup mode for RSVP signaling to the UE from the policy control function (PCF).

In accordance with the present invention, the originating UE, during session setup, sends an SIP message to a proxy-call state control function (P-CSCF) of a home network providing a list of all media types, capabilities and preferred mode of operation. The P-CSCF, which contains the policy control function (PCF) is ultimately responsible for allocation of resources necessary to carry out the desired session. The SIP information is utilized to make a final decision regarding the RSVP operation. The P-CSCF (PCF) may request the RSVP capabilities of the GGSN, which capabilities may be stored within a suitable locale, and based on capability information of the UE and GGSN, a final setup decision is made. If both the UE and GGSN are RSVP capable, the P-CSCF (PCF) can decide the entity which will provide RSVP signaling. On the other hand, if the GGSN is not RSVP-capable or does not wish to support an RSVP proxy operation, the decision to initiate RSVP signaling may be passed to the UE. If the P-CSCF determines that GGSN shall provide the RSVP proxy, the P-CSCF advises the originating UE using SIP to stop RSVP signaling. A decision is then passed to the GGSN using common open policy server (COPS) protocol to start RSVP operation.

The SIP is also utilized, further in accordance with the present invention, to provide an admission process employing the QoS capabilities of the communicating entities to determine the feasibility of a successful outcome of a call/session setup procedure. The originating UE/network indicates the intended QoS protocol during a call setup procedure. In addition, a terminating UE/network when responding, will indicate, by way of the SIP, if it is capable of supporting a particular QoS protocol. When not capable, the call will be rejected with a clear indication of the reason, which helps to reduce the cost of call setup, the number of messages over the network employed for QoS signaling and the elimination of improper billing for services that could not be provided.

More efficient use of a call (session) procedure is accomplished by exchanging all available QoS capabilities during the call setup phase thereby eliminating a scenario where a call (session) is successfully established between an RSVP capable UE/network and a non-capable network including a UE which thereafter expires due to lack of response to the RSVP signaling messages from the non-capable terminating side.

Faster call (session) setup time is achieved by enabling the policy control function (PCF) at the terminating side to make an early decision regarding the RSVP sender/receiver proxy function at the GGSN during the call setup. The decision to instantiate the RSVP proxy function at the GGSN is made only after the call setup phase is successfully completed and during the RSVP signaling phase especially for the terminating side of the session being initiated. The invention further minimizes, if not eliminates, unnecessary RSVP signaling over the network as well as the air interface thereby improving overall system performance and capacity and minimizing those cases where a user is billed for the resources allocated as a result of a successful session setup but in which a session is terminated without the services being performed.

BRIEF DESCRIPTION OF THE DRAWING(S)

The present invention and the objectives and advantages thereof will be best understood from a consideration of the following figures wherein like elements are designated by like numerals and wherein:

FIG. 3 shows a session initiation protocol (SIP) invite message format currently in use;

FIG. 5 shows a session initiation protocol (SIP) invite message format conveyed from a UE to a P-CSCF and incorporating indications of reservation protocol and preferred configuration, in accordance with the present invention;

FIG. 6 shows a session initiation protocol (SIP) 183 message format from a terminating UE to a P-CSCF of the terminating network and incorporating reservation protocol and preferred configuration, in accordance with the present invention;

FIG. 7 shows a session initiation protocol (SIP) 183 message format from a P-CSCF of the originating network to a user equipment UE of the originating network and incorporating indications of reservation protocol and preferred configuration in accordance with the present invention;

FIG. 10 shows a session description protocol (SDP) incorporating reservation protocol capability and preferred configuration request and decision, in accordance with the present invention;

FIG. 11 shows a SIP invite message format from UE (A) to P-CSCF (A) as shown in FIG. 8 and incorporating reservation protocol capability and preferred configuration, in accordance with the present invention;

FIG. 12 shows a SIP invite message format from a P-CSCF (A) to an S-CSCF (A), shown for example in FIG. 8 and incorporating proposed QoS reservation protocol, in accordance with the present invention;

FIG. 13 shows a SIP 183 message format from a terminating UE (B) to a terminating P-CSCF (B) as shown in FIG. 8, in response to the invite from the originating UE (A), in accordance with the present invention and wherein the UE (A) is RSVP capable;

FIG. 14 shows an SIP 183 message format from a terminating P-CSCF (B) to a terminating S-CSCF (B), shown in FIG. 8, wherein UE (B) is RSVP capable;

FIG. 15 shows an SIP 183 message format from a terminating UE (B) to a terminating P-CSCF (B), shown in FIG. 8, and wherein UE (B) is not RSVP capable and requests an RSVP proxy function;

FIG. 16 shows an SIP 183 message format from a terminating P-CSCF (B) to a terminating S-CSCF (B) in a direction toward the originating UE (A), as shown in FIG. 8, in accordance with the present invention and wherein UE (B) is not RSVP capable and the network acts as RSVP proxy;

FIG. 17 illustrates an SIP 823 message format from a terminating P-CSCF (B) to a terminating S-CSCF (B) toward the originating UE (A), as shown in FIG. 8, in accordance with the present invention and wherein neither the UE nor the network are RSVP capable;

Figure 8:
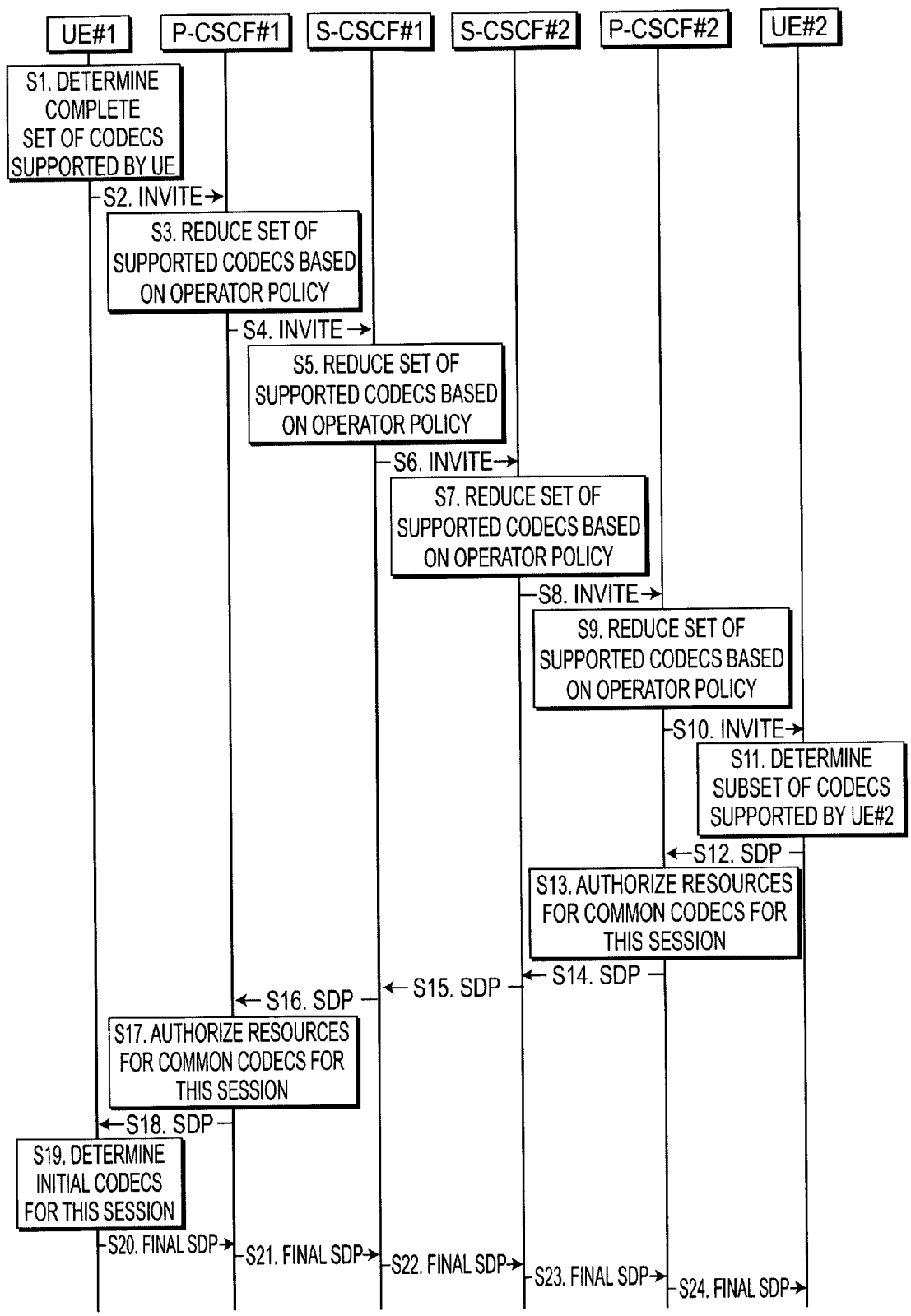
FIG. 8 is a session establishment procedure illustrating media negotiation procedure performed during an initial session establishment in accordance with current standards.

FIG. 18 is an SIP 183 message format from the originating P-CSCF (A) to the originating UE (A), as shown in FIG. 8, in accordance with the present invention and wherein both sides of the requested session can support RSVP and the GGSN proxy is installed; and FIG. 19 shows an SIP 183 message from the originating P-CSCF (A) to the originating UE (A) in accordance with the present invention and for the case where neither side supports RSVP and DiffServ protocol is acceptable.

DETAILED DESCRIPTION OF THE PREFERRED EMBODIMENT(S)

Figure 1:
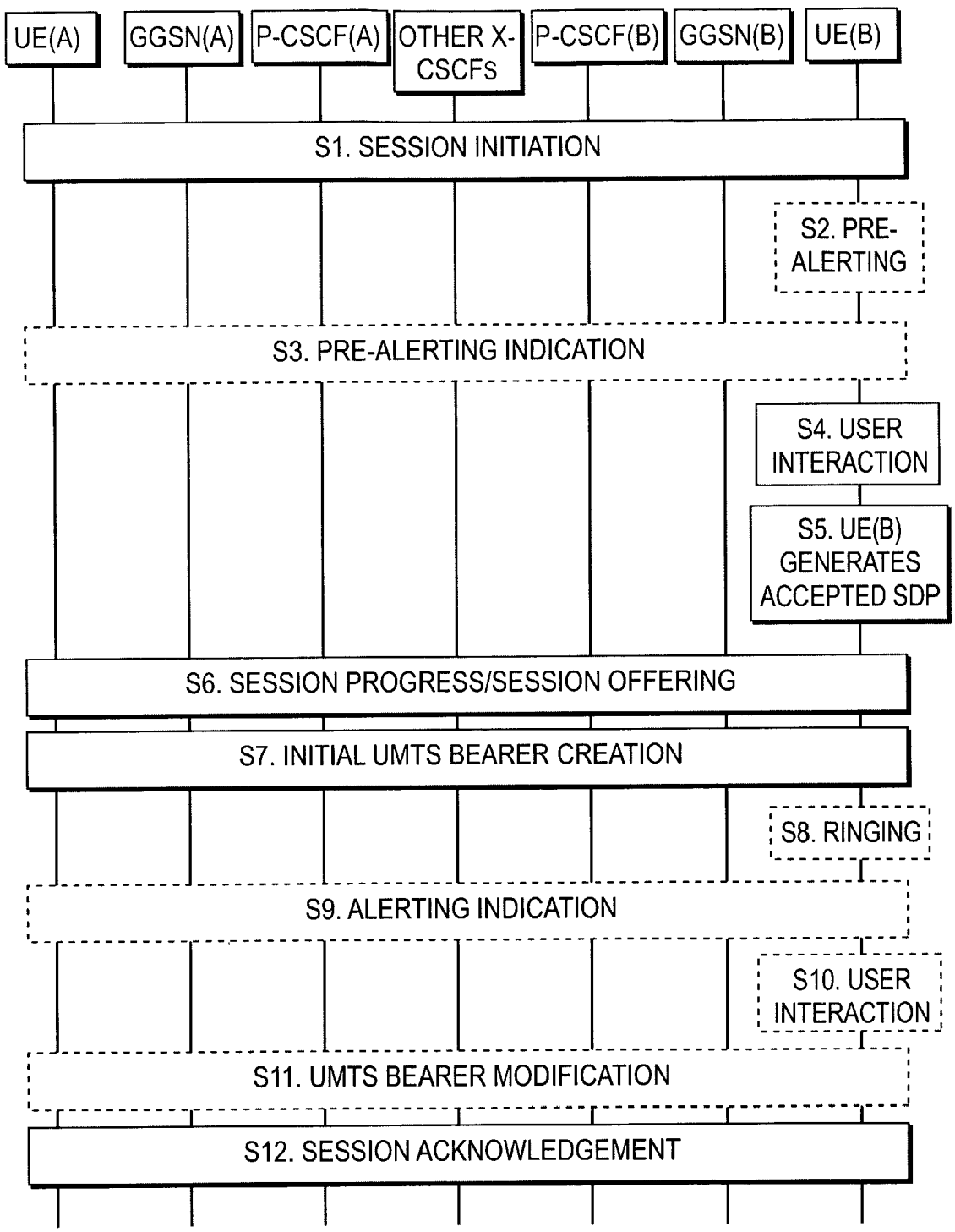
FIG. 1 is a simplified schematic diagram showing a network architecture and basic session establishment procedure employing SIP.

FIG. 1 shows a simplified overview of a session flow in a UMTS network architecture. The network includes UE (A) and UE (B). UE (A) is located in a network A which includes GGSN (A) and P-CSCF (A), network A may either be the home network of UE (A) or be a network in which UE (A) is roaming.

UE (B) is located in a network B having a P-CSCF (B) and GGSN (B). Network B may either be the home network of UE (B) or a network in which UE (B) is roaming. One or more other networks/CSCFs may exist between networks A and B.

Operation of a UNITS Call/Session Setup Procedure is as follows:

Step S1. UE(A) starts a Session Initiation procedure to UE(B) that includes an SDP proposal.

The steps 2-4 are optional and may depend on terminal implementations and/or terminal preconfigured settings. As a result, they are shown in dotted fashion.

Step S2. The user at UE(B) is pre-alerted.

Step S3. An indication of the pre-alerting may be sent towards UE(A).

Step S4. User at UE(B) will then interact and express his/her wishes regarding the actual session.

Step S5. UE(B) generates an accepted SDP based on terminal settings, terminal pre-configured profiles and optionally the user's wishes.

Step S6. The accepted SDP is forwarded to the UE(A) in the payload of a reliable SIP response.

Step S7. Initial bearer creation procedure is performed. During this bearer creation step the resources in the UE(A)'s and UE(B)'s access network are reserved with PDP context procedures. Bearer resources in external networks may also be reserved at this point.

The steps 8–10 are also optional and may be skipped, and are shown in dotted fashion.

Step S8. Terminal at UE(B) starts ringing.

Step S9. The alerting indication is sent towards the UE(A).

Step S10. User at UE(B) may interact and express his/her wishes regarding the actual session.

Step S11. UE(A) and UE(B) may perform bearer modification procedure at this point, if the initial bearers reserved in step S7 and the wishes of user at UE(B) are different. During this bearer modification step the resources in the UE(A)'s and UE(B)'s access network may be modified by modifying the PDP context, and the resource reservation in the external network may also be modified.

Step S12. Session initiation procedure is acknowledged.

Figure 2:
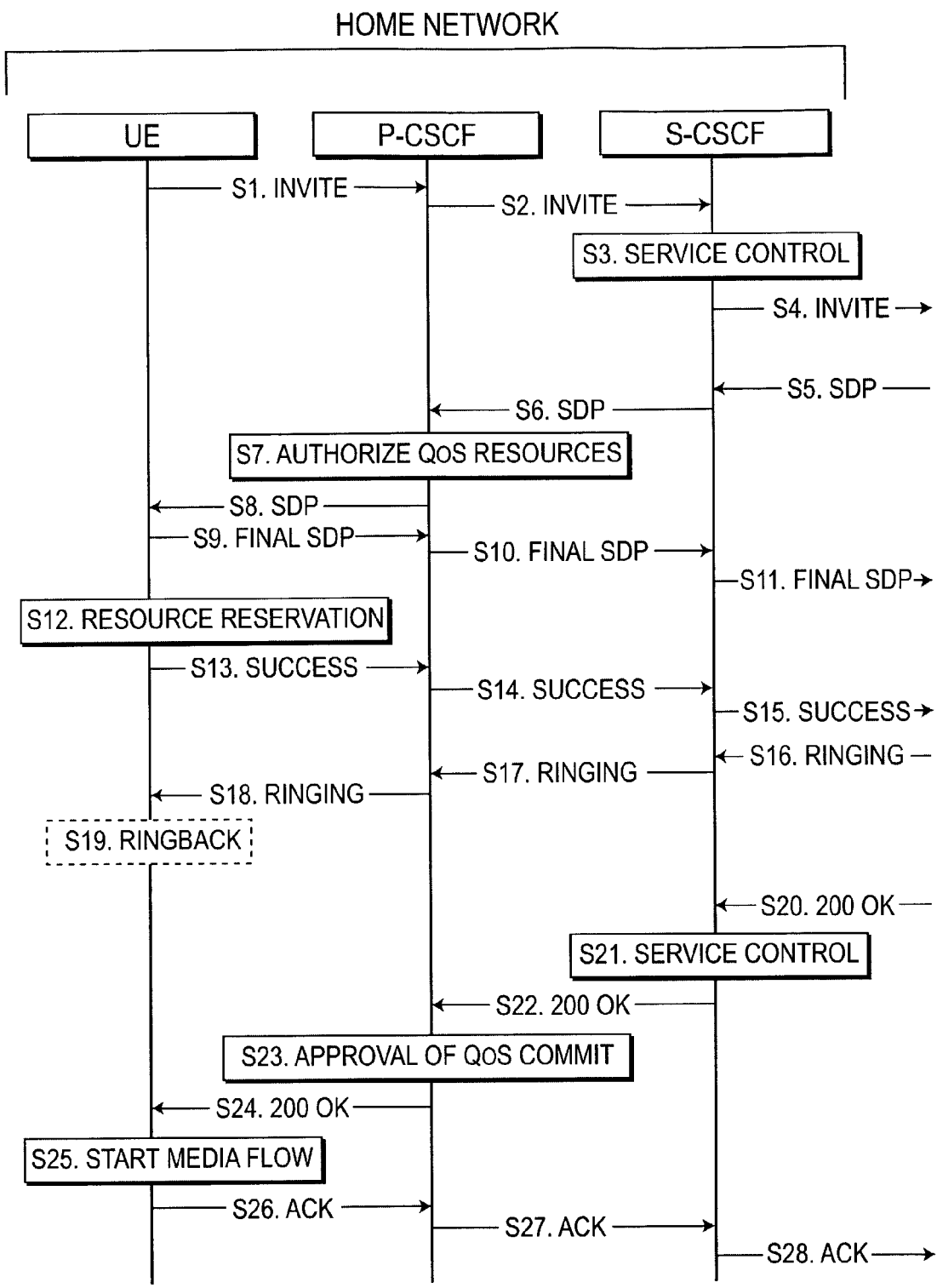
FIG. 2 shows a session establishment procedure for message exchange at the originating UMTS architecture of the type shown in FIG. 1 wherein the procedure is shown in greater detail.

FIG. 2 shows the session message exchange flow at the UMTS home network architecture comprised of a UE, a P-CSCF and an S-CSCF and in accordance with existing standards.

At step S1 the UE sends an SIP invite to the P-CSCF of the home network, which invite contains this session description protocol (SDP). P-CSCF examines the invite messaging and forwards it to the S-CSCF, at step S2. S-CSCF of the home network examines the invite message and, at step S3, exerts service control, obtains the network operator serving the called UE and then sends the invite message to the terminating network of the called UE or, alternatively, the network intervening between the home and terminating network.

The home network S-CSCF, upon receipt of a session description protocol (SDP) from the terminating network, at step S5, relays this to the home network P-CSCF, at step S6. The P-CSCF, at step S7 authorizes the QoS resources and thereafter, at step S8, relays the SDP to the home network UE.

At step S9, the home network UE generates a final SDP message setting forth session, ID, version, session creator, destination address, real time protocol (RTP) payload type, RTP format, clock rate and port, directed to the home network P-CSCF which, at step S10, relays the final SDP to S-CSCF of the home network which in turn, at step S1, relays the final SDP to the terminating network or, in the alternative, the network intervening between the home and terminating networks.

The UE, at step S12, creates a resource reservation which (more information need here) resulting in relay of a success message from the UE to the P-CSCF of the home network at step S13, from the P-CSCF of the home network to the S-CSCF of the home network, at step S14, and from the home network S-CSCF to the terminating network or in the alternative an intervening network, at step S15. Having established the resource reservation, ringing from the terminating UE is subsequently relayed to the S-CSCF of the home network at step S16 and relayed from the S-CSCF to the P-CSCF of the home network at step S17 and from the P-CSCF of the home network to the UE of the home network at step S18.

Responsive to the ringing indication, the home network UE generates a ring back at step S19 which indicates to the originating UE that the destination is ringing.

The terminating network, in addition to relaying a ringing indication ultimately to the home network UE, generates, at S20, a 200 OK indication to S-CSCF of the home network, at step S21, which exerts service control, required by session setup completion and, at step S22, relays the 200 OK message to P-CSCF of the home network which provides, at step S23 approval of the quality of service (QoS) commit and relays the 200 OK message to the home network UE, at step S24.

The home network UE, at step S25, initiates media flow, transmitting an acknowledge (ACK) to the P-CSCF of the home network, at step S26, the P-CSCF relaying the acknowledgement to the S-CSCF of the home network, at step S27, which, in turn, relays the acknowledge (ACK) to the terminating network or, in the alternative, to an intervening network, at step S28.

FIG. 3 shows an SIP message format which is defined in accordance with the existing standards and as will be more fully described, lacks indications of reservation protocol and preferred configuration. The SIP message shown in FIG. 3 comprises a request and a response (first line), a message header (next fourteen (14) lines) and a message body (remaining lines 15–38).

Figure 4:
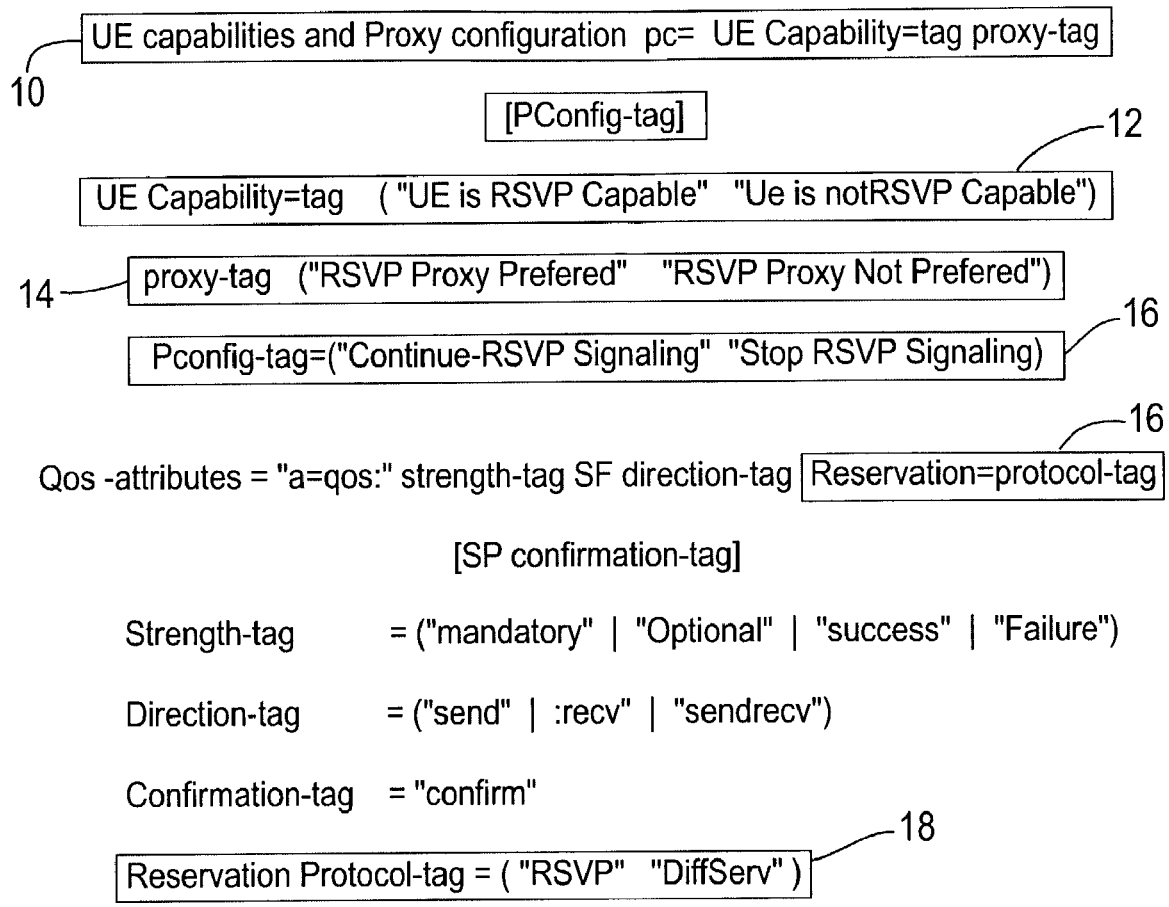
FIG. 4 shows a session description protocol (SDP) incorporating the UE capability, the proxy configuration derived by the UE and the decision regarding the configuration set-up by the P-CSCF (PCF) provided in accordance with the present invention.

FIG. 4 shows the additions to existing SIP messages provided in accordance with the present invention. The proposed formats include the UE capability and proxy configuration heading at 10, the UE capability at 12, the proxy configuration 14 desired by the UE and the decision regarding configuration setup by the P-CSCF (PCF), at 16. The use of these formats enables the UE to indicate to the P-CSCF (PCF) whether it is RSVP capable or not, shown at 14 and the preferred mode of operation, i.e., whether the RSVP sender/receiver proxy at the GGSN is preferred, shown at 16. The novel message format shown in FIG. 4 further enables the home network P-CSCF (PCF) to indicate the final setup to the UE by direct decision, i.e. providing the UE with a message to stop RSVP signaling which indicates that the RSVP proxy function is instantiated at the GGSN or alternatively to continue RSVP signaling which indicates that no proxy is available. The novel message format shown in FIG. 4 further enables the UE to indicate which flow is using RSVP versus differentiated services (DiffServ) protocol as shown at 18.

FIG. 5 shows an SIP invite message which incorporates all the additional capabilities of the present invention and wherein UE (A) indicates that it is RSVP capable, shown at 19, and that a proxy operation is preferred, shown at 20. The UE further indicates that the quality of service (QoS) for three different media flows I, II, III will be carried using RSVP protocol, shown respectively at 22, 24 and 26, while the QoS in last media flow IV will be carried by differentiated services (DiffServ), as shown at 28.

FIG. 6 shows an SIP 183 message which is the SDP message from the terminating UE shown, for example, at step S5 of FIG. 2 wherein the terminating UE (not shown) replies to the invite from the originating UE of FIG. 2 indicating to P-CSCF that it is RSVP capable, shown at 30, and that RSVP proxy operation is not preferred, shown at 32. The terminating UE further indicates that RSVP protocol will also be used for the support of media flow, shown at 34. These capabilities provided in the SIP are intended only for the serving network configuration use and has no influence on other entities within the architecture. The P-CSCF may delete the proxy configuration when the (PC=) section of the SIP message, shown at 30 and 32, before forwarding the message to the next hop, i.e., the next router the message goes through.

FIG. 7 shows the SIP 183 message forwarded to originating UE by the home network P-CSCF, and indicating to the UE that the request for RSVP proxy function of GGSN is granted and that the originating UE should stop RSVP signaling, as shown at 36. This message could also be applied to other SIP message such as SIP 200 OK messages, among others. The SIP 183 message of FIG. 7 further confirms that the media flow will be carried using RSVP protocol, as shown at 38.

As was set forth hereinabove, the present invention has the further capability of enabling the originating the UE/network to indicate QoS protocol during the call setup procedure. This technique further mandates that the determining UE/network indicates in a response whether it is capable of supporting the particular QoS protocol. In a case where the terminating network is not capable of supporting the proposed QoS protocol, the call is rejected with a clear indication of the cause thereby: reducing the cost of call setup, reducing the number of messages over the network for QoS signaling and removing the possibility of improper billing for services that cannot be provided.

By providing an existing UMTS call (session) setup mechanism, i.e. SIP, the originating UE is capable of indicating to the terminating UE the type of protocol intended for QoS, for example, RSVP. The UMTS call (session) mechanism further enables the terminating UE to indicate to the originating UE and the supporting (serving) network whether the type of protocol proposed by the originating UE for QoS, for example, RSVP, is supported as well as being capable of indicating to the originating user and the serving network, the type of QoS protocol the terminating user can support for the proposed media type.

The UMTS call (session) setup mechanism, i.e., SIP by which the terminating network, i.e. P-CSCF/PCF has the capability of whether a call (session) setup can be continued or terminated based on the capabilities returned by the terminating user (UE) and the network support of the GGSN RSVP Proxy function. The UMTS call (session), i.e., SIP, enables the P-CSCF/PCF at the terminating network to indicate to the originating network and user whether the network can support RSVP based QoS. The UMTS call (session) setup mechanism, i.e., SIP, enables the P-CSCF/PCF at the terminating network to update the supported QoS protocol indicated by the terminating UE, i.e., the ability to restore the original proposed protocol by the originating UE as a result of instantiating the RSVP function. The UMTS call (session) setup mechanism, i.e., SIP, enables the GGSN RSVP sender/receiver proxy function to be instantiated during a call setup rather than during the QoS reservation phase.

The UMTS call (session) setup mechanism, i.e., SIP, enables the P-CSCF/PCF of the originating network to indicate to the originating user: whether the terminating network can support RSVP QoS; whether the RSVP proxy function is instantiated at the GGSN or RSVP based media flows, i.e. whether the UE should or stop continue sending RSVP signaling messages. The UMTS call (session) setup mechanism, i.e., SIP, enables the originating UE to terminate the multimedia call/session setup procedure based on the response received which advises as to the capability of the terminating network to support QoS protocol. The UMTS call (session) setup mechanism, i.e., SIP, further enables the originating UE to continue the multimedia call/session setup procedure by adjusting the intended/proposed QoS protocol to support certain media based on the response received as to the capability of the terminating user.

FIG. 8, shows a communications system in which UE #1 is located within a network including P-CSCF #1 and S-CSCF #1, which network may be the home network of the UE or a network in which UE #1 is roaming; and UE #2 in a network including CSCF #2 and P-CSCF #2, which network may either be the home network or UE #2 or a network where UE #2 is roaming. In the embodiment shown in FIG. 2, it will be assumed that both the originating and terminating UE are in their home network, for purposes of simplifying the description thereof, it being understood that the system is basically the same except for the addition of ultimate transfer of messages through additional intervening networks.

In the example given, UE #1, at step S1, determines a complete set of codecs that UE #1 is capable of supporting for the session being requested. UE #1 builds a session description protocol (SDP) containing bandwidth requirements and characteristics of each media and assigns local port numbers for each possible media flow. Multiple media flows may be proposed and for each media flow (M=line and SDP) there may be multiple codec choices offered. At step S2, UE #1 sends the initial INVITE message to P-CSCF #1 containing the SDP built by UE #1. P-CSCF #1, at step S3, examines the media parameters and removes any choices that the network operator decides, based on local policy, not to allow on a network and, at step S4, forwards the INVITE message to S-CSCF #1. S-CSCF #1, at step S5, examines the media parameters and removes any choices that the subscriber does not have authority to request, i.e. parameters of which the subscriber has not requested and paid for as part of the services provided to the subscriber. S-CSCF #1 forwards the INVITE message to S-CSCF #2, at step S6 which, at step S7 reduces a set of supported codecs based on operator policy in a matter substantially similar to step S5 performed by S-CSCF #1 and thereafter, at step S8 forwards the INVITE message to P-CSCF #2, which, in a manner similar to step S3 performed by P-CSCF #1, examines the media parameters and removes any choices that the network operator will not allow on the network, based on local policy, at step S9, and, at step S10, sends the message to the terminating UE #2.

UE #2 compares the codecs that it is capable of supporting for the requested session and determines the intersection appearing in the SDP in the invite message. For each media flow that is not supported, UE #2 and SDP enter media (m=line) with port=0. For each media flow that is supported, UE #2 inserts an SDP entry with an assigned port and with the codecs in common with those from UE #1, these activities being performed at step S11. UE #2 returns the SDP listed common media flows and codecs to P-CSCF #2, at step S12.

P-CSCF #2, at step S13, authorizes a QoS resource system for the remaining media flows and codec choices for the common codecs for the session and forwards this SDP to S-CSCF #2, at step S14. S-CSCF #2, at step S15, forwards the SDP message to S-CSCF #1, which, at step S16, forwards the SDP message, to P-CSCF #1. P-CSCF#1, at step S17, authorizes the resources for common codecs for the session and, at step S18, forwards the SDP to UE #1.

UE #1, at step S19 determines the initial codecs for this session and the media flows which should be used for this session. If there was more than one media flow or, there was more than one choice of codec for a media flow, UE #1 includes an SDP and a "final SDP" message sent to UE #2 by UE #1, at step S20, this message being forwarded, as shown by steps S21–S24.

UE#2 sends the "final SDP" message to UE #1 along a signaling path established by the INVITE request, which signaling path has been omitted for purposes of simplicity, it being understood that the signaling path is in accordance with existing capabilities. The remainder of the multi-media session is completed in accordance with a single codec session employing conventional means.

Figure 9:
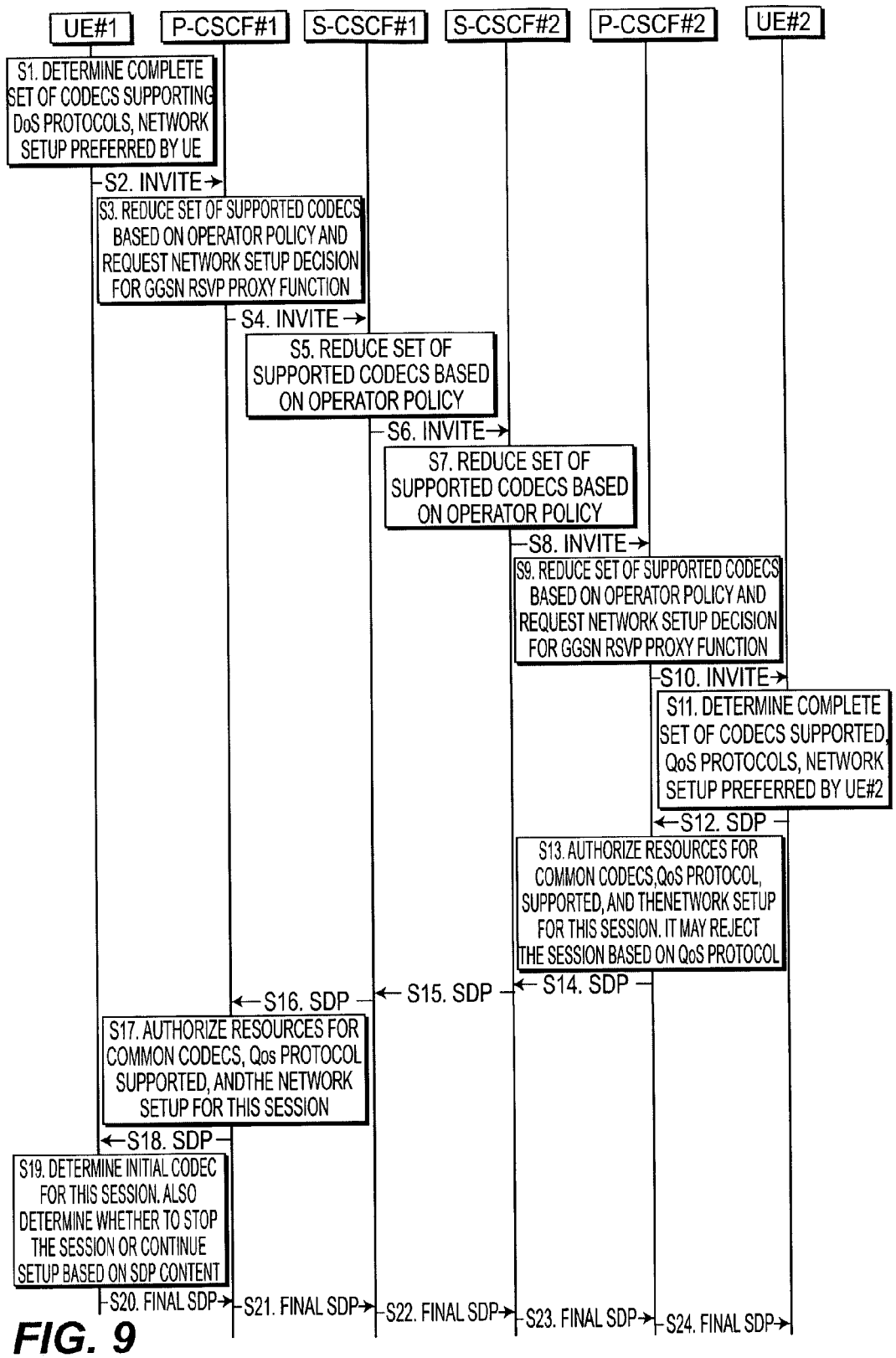
FIG. 9 shows a session establishment procedure similar to that shown in FIG. 8 and incorporating call/session establishment capabilities employing SIP, in accordance with the present invention.

FIG. 4 shows a call (session) flow embodying the principles of the present invention and wherein like steps as between FIGS. 8 and 9 are designated by like numerals and wherein distinguishing steps are designated by a "prime."

In the procedure shown in FIG. 9, UE #1 at step S1', in addition to determining the complete set of codecs capable of supporting the requested section and building an SDP in accordance with step S1 of FIG. 8, UE #1 further determines a supporting QoS protocol, such as RSVP DiffServ, . . . and so forth that UE #1 is capable of supporting for this session, as shown at 42 of FIG. 10. As with the current method of step S1 shown in FIG. 8, the SDP is built containing bandwidth characteristics of each media flow as well as the assignment of local port numbers to each possible media flow. Multiple media flows maybe offered as shown in the lines n=SDP, for example, in FIG. 11, which shows two video media flows and two audio media flows at 44 and 46 at FIG. 11, as well as showing multiple calls. However it should be noted that the two (2) audio media flows in FIG. 11 each have a different QoS protocol, one being RSVP and one being DiffServ.

UE #1 sends the aforementioned SDP INVITE message to P-CSCF #1 at step S2. P-CSCF #1, at step S3', examines the media parameters and removes any choices that the network operators decide, based on local policy, not to allow on the network, as was the case with step S3, making reference to FIG. 8. P-CSCF #1 further examines the RSVP capability of UE #1 as well as its preference of the RSVP proxy operation. P-CSCF #1 passes this information to policy control function (PCF) to request a decision regarding a network setup. P-CSCF #1 removes the (rc=) entry, shown at 48 in FIG. 11, this entry being omitted in the SDP shown in FIG. 12 and this SDP message (FIG. 12) is forwarded as the invite message to S-CSCF #1, as shown in step S4. S-CSCF #1, at step S5 examines the media parameters and removes any choices the subscriber does not have authority to request, similar to step S5 in the embodiment shown in FIG. 8, whereupon S-CSCF #1 forwards the INVITE through the S-S session flow procedures, through S-CSCF #2, at step S6.

S-CSCF #2, similar to the current network technique shown in FIG. 8 at step S7, examines the media parameters and removes any choices that the destination describer does not have the authority to request and forwards the INVITE message, at step S8, to P-CSCF #2.

P-CSCF #2, at step S9', performs all of the functions performed by P-CSCF #2 as shown in step S9 in FIG. 8 by examining the media parameters and removing any that the network operator decides, based on local policy, not to allow on the network. In addition thereto, P-CSCF #2 examines the QoS protocol offered in the SDP message prior to passing the information to PCF for decision regarding the support of any optional functionality, such as the GGSN RSVP proxy function. This SDP INVITE message is then forwarded to UE #2, at step S10, as shown in FIG. 12.

UE #2, at step S11' determines a complete set of codecs, as well as the supporting QoS protocols such as RSVP, DiffServ and so forth, that UE #2 is capable of supporting for the session. Similar to step S11 in the current technique shown in FIG. 8, UE #2 determines the intersection with those appearing in the SDP and the INVITE message. For each media flow that is not supported, UE #2 inserts an SDP entry for media, i.e., n=line, with port=0. For each media flow that is supported, UE #2 inserts an SDP entry with an assigned port and with the codecs which are in common with those in the SDP message from UE #1. These steps are substantially identical to the steps shown as S11 in FIG. 8. UE #2 is further able to indicate to P-CSCF #2 whether it is capable of supporting RSVP and whether the RSVP sender/receiver proxy function is the preferred setting. UE #2 is also able to propose a different QoS protocol in the event that the existing one is not supported, as is shown in FIGS. 13–15. More specifically, FIG. 13 shows a modified SIP 183 message format from UE #2 to P-CSCF #2 in response to the INVITE from UE #1, the embodiment in FIG. 13 showing the case where UE #2 is RSVP capable, as shown at 50 in FIG. 13. FIG. 14 shows a modified SIP 183 message format from P-CSCF #2 to S-CSCF in the case where UE #2 is RSVP capable. FIG. 15 shows a modified SIP 183 message format from UE #2 to P-CSCF #2 responsive to the INVITE from UE #1 and in the case where UE #2 is RSVP capable, as shown at 52 in FIG. 16.

UE #2 transfers the SDP listing, media flows and codecs to P-CSCF #2 as shown at step S12 in FIG. 12.

P-CSCF #2, at step S13' authorizes the QoS resources for the remaining media flows and codec choices. P-CSCF #2 examines the RSVP capabilities of UE #2 and passes this information to PCF for a decision on both the RSVP proxy function and overall support for the proposed session. P-CSCF #2 may either reject the session, based on lack of support of the proposed QoS protocol, or allow the negotiations to continue by passing the proposed changes to QoS protocol. As show at 52 in FIG. 16, in a case where UE #2 is RSVP capable, P-CSCF #2 determines the network configuration and passes an indication to the originating network that RSVP is supported. In a case where UE #2 is not RSVP capable and UE#2 indicated it can support the proposed media type using different QoS protocol, i.e. DiffServ, while the network can support RSVP proxy function, FIG. 11 showing an SIP 183 message format from UE #2 to P-CSCF #2 in a case where UE #2 is not RSVP capable and asks for RSVP proxy function, FIG. 12 showing an SIP 183 message format from P-CSCF #2 to S-CSCF #2 and directed toward UE #1 in a case where UE #2 is not RSVP capable and the network is RSVP capable.

P-CSCF #2 is further able to instantiate the RSVP proxy function, restore the proposed QoS, for example, RSVP, and pass an indication to the originating network that RSVP is supported. In an example where UE #2 and a serving network are not RSVP capable as shown at 54 in FIG. 13, P-CSCF #2 may choose to pass an indication to the originating side that: RSVP is not supported and maintain its current proposal by UE #2 to carry the media type, to carry another QoS protocol; or simply reject the session based on operator policy. P-CSCF #2 forwards the SDP response to S-CSCF #2, at step S14. S-CSCF #2 forwards the SDP response to S-CSCF #1 at step S15 and S-CSCF #1 forwards the SDP response to P-CSCF #1 at step S16.

P-CSCF #1, at step S17', authorizes the QoS sources for the remaining media flows and codec choices and further examines RSVP capabilities of the terminating network and passes this information to UE #1 as shown in FIGS. 18 and 19. P-CSCF #1 is further capable of passing decisions regarding GGSN RSVP proxy configuration, i.e., whether the RSVP proxy function is supported. In the case where the proxy operation is supported, the "stop RSVP signaling" message as shown at 56 in FIG. 18, is sent to UE #1 with the indication that RSVP is supported on the other side, as shown at 58 in FIG. 18 by the message "RSVP capable". In the event that the RSVP proxy function is not supported, the message "continue RSVP signaling" is sent as an alternative, these alternative messages respectively appearing at 56 and 58 in FIG. 18. If the terminating side does not support RSVP then the combination "not RSVP capable" and "stop RSVP signaling" is sent to UE #1 not to use RSVP for the proposed media stream and that the proxy function is not installed. In this case the alternative message "not RSVP capable" is inserted at 58 in FIG. 18 in the example given.

P-CSCF #1, at step S18 forwards the SDP response from UE #2 to UE #1.

UE #1 determines which media flows should be used for this session and which codecs should be used for each of the media flows. If there is more than one media flow, or if there is more than one choice of codec for media flow than UE #1 must include an SDP in the "final SDP" message or, alternatively, UE #1 may choose to terminate the session establishment procedures if the media streams cannot be delivered using the proposed QoS protocols, which activities are performed at step S19'.

UE #1 sends the "final SDP message to UE #2 along the signaling path established by the INVITE request as shown in steps S20–S24, which steps are similar to steps S20–S24 in the current technique employed in the call (session) flow shown in FIG. 8. The remainder of the multi-media session is completed in a matter identical to the single media/single codec session in the manner described hereinabove in connection with the current method set forth in the description of FIG. 8. The modified session description protocol for an SDP shown in FIG. 10 represents the "SDP" message sent from UE#1 to UE#2.

What is claimed is:

1. A method for establishing communication between a mobile unit (UE) and a network, which communication uses resource reservation protocol (RSVP), comprising:
   a) the UE sending a session initiation protocol (SIP) message incorporating: the RSVP capability of the UE; media types to be transmitted, capabilities and a preferred mode of operation;
   b) a proxy-call state control function of the network, responsive to the SIP, making a decision as to whether the network or the UE shall initiate RSVP signaling; and
   c) the network communicating the decision of step (b) to the UE.

2. The method of claim 1 wherein the network, at step (b), determines that the UE should not initiate RSVP signaling when the UE is not RSVP capable and the network is RSVP capable; and
   at step (c), the network sends a message to the UE that it should not initiate RSVP signaling.

3. The method of claim 1 wherein the network, at step (b), determines that the UE should initiate RSVP signaling when the UE is RSVP capable and the network is RSVP capable; and
   at step (c), the network sends a message to the UE that it should initiate RSVP signaling.

4. The method of claim 1 wherein the network, at step (b), determines that the UE should not initiate RSVP signaling when both the UE and the network are RSVP capable; and
   at step (c), the network sends a message to the UE that it should not initiate RSVP signaling.

5. The method of claim 1 wherein the network, at step (b), determines that the UE should initiate RSVP signaling when both the UE and the network are RSVP capable; and
   at step (c), the network sends a message to the UE that it should initiate RSVP signaling.

6. The method of claim 1 wherein the network, at step (b) obtains RSVP capability of the network which is stored at a given locale.

7. Apparatus for establishing communication between a mobile unit (UE) and network, which communication uses resource reservation protocol (RSVP) comprising:
   the UE having means for sending a session initiation protocol (SIP) message incorporating: the RSVP capability of the UE; media types to be transmitted, capabilities and a preferred mode of operation;
   said network, including a proxy-call state control function of the network, which, responsive to the SIP, makes a decision as to whether the network or the UE shall initiate RSVP signaling, and
   the network further including means for sending the decision of the network to the UE.

8. The apparatus of claim 7 wherein the network, further includes means for determining that the UE should not initiate RSVP signaling when the UE is not RSVP capable and the network is RSVP capable; and
   the network further includes means for sending a message to the UE that it should not initiate RSVP signaling.

9. The apparatus of claim 7 wherein the network, further includes means for determining that the UE should initiate RSVP signaling when the UE is RSVP capable and the network is RSVP capable; and
   the network further includes means for sending a message to the UE that it should initiate RSVP signaling.

10. The apparatus of claim 7 wherein the network, includes means for determining that the UE should not initiate RSVP signaling when both the UE and the network are RSVP capable; and
    the network further includes means for sending a message to the UE that it should not initiate RSVP signaling.

11. The apparatus of claim 7 wherein the network, includes means for determining that the UE should initiate RSVP signaling when both the UE and the network are RSVP capable; and
    the network further includes means for sending a message to the UE that it should initiate RSVP signaling.

12. The apparatus of claim 7 wherein the network further includes means for obtaining RSVP capability of the network from a memory.

13. The apparatus of claim 7 wherein the network includes a general packet radio service (GPRS) gateway support mode (GGSN),
    said proxy-call state control function obtaining the capability of said GGSN to assign initiation of RSVP signaling.

14. The apparatus of claim 7 wherein said means for sending includes means to request the UE to initiate RSVP signaling when the network does not want to initiate RSVP signaling.

15. The apparatus of claim 14 wherein said means for sending includes means for passing a decision to start RSVP operation to said GGSN using common open policy server (COPS) protocol.

16. A method for facilitating call/session initiating setup time between a initiating mobile unit (initiating UE) and a terminating mobile unit (terminating UE), each respectively associated with an initiating and terminating home network which may be one of the same network and a different network, comprising:
    the initiating UE transmitting a session initiation protocol (SIP) message to the terminating UE which incorporates a list of media to be transmitted, a preferred mode of operation, an RSVP capability and the ability of supporting a given quality of service (QoS) capabilities; and
    a terminating network making a decision regarding an RSVP proxy function.

17. The method of claim 16 wherein the terminating UE, responsive to a received SIP, sends a SIP to the initiating UE requesting an alternative to an RSVP capability.

18. The method of claim 17 further comprising:
    sending a Diff Serv as an alternative to an RSVP capability.

19. Apparatus for facilitating call/session initiating setup time between an initiating mobile unit (initiating UE) and a terminating mobile unit (terminating UE), each respectively associated with an initiating and terminating home network which may be one of the same network and a different network, comprising:

the initiating UE having means for transmitting a session initiation protocol (SIP) message to the terminating UE which incorporates: a list of media to be transmitted, a preferred mode of operation, an RSVP capability and the ability of supporting a given quality of service capabilities; and a terminating network having means for making a decision regarding an RSVP proxy function.

20. The apparatus of claim 19 wherein the terminating UE includes means responsive to a received SIP, for sending a SIP to the initiating UE requesting an alternative to an RSVP capability.

21. The apparatus of claim 20 further comprising: means for sending a Diff Serv as an alternative to an RSVP capability.

* * * * *

UNITED STATES PATENT AND TRADEMARK OFFICE
CERTIFICATE OF CORRECTION

| | | |
|---|---|---|
| PATENT NO. | : 7,227,865 B2 | |
| APPLICATION NO. | : 10/217692 | |
| DATED | : June 5, 2007 | |
| INVENTOR(S) | : Shaheen et al. | |

It is certified that error appears in the above-identified patent and that said Letters Patent is hereby corrected as shown below:

ON THE TITLE PAGE

Item (75), Inventors, delete lines 1, 2, & 3, and insert therefor
--Inventors: Kamel M. Shaheen, King of Prussia, PA
(US); Brian Gregory Kiernan, Voorhees, NJ
(US)--.

Item (57), ABSTRACT, line 2, after the word "system", delete "(GGRS)" and insert therefor --(GPRS)--.

Item (57), ABSTRACT, line 13, before the words "a final step", delete "communication" and insert therefor --communicating--.

At FIG. 4, element 12, delete "Ue is notRSVP Capable")" and insert therefor --"UE is not RSVP Capable")--.

At FIG. 4, element 14, after "proxy-tag", delete "("RSVP Proxy Prefered" "RSVP Proxy Not Prefered")" and insert therefor --("RSVP Proxy Preferred" "RSVP Proxy Not Preferred")--.

At FIG. 4, element 16, delete "Qos", and insert therefor --QoS--.

At FIG. 5, element 20, after the word "capable", delete "RSVP Proxy Prefered", and insert therefor --RSVP Proxy Preferred--.

At FIG. 6, element 32, after the word "capable", delete "RSVP Proxy Not Prefered" and insert therefor --RSVP Proxy Not Preferred--.

At FIG. 9, element S1, line 3, before the word "PROTOCOLS", delete "OoS" and insert therefor --QoS--.

At FIG. 9, element S13, line 3, before the word "SETUP", delete "THENETWORK" and insert therefor --THE NETWORK--.

At FIG. 9, element S17, line 2, before the word "PROTOCOL", delete "Oos" and insert therefor --QoS--.

At FIG. 10, 3$^{rd}$ boxed element from top, delete ""notRSVP Capable")" and insert therefor --"not RSVP Capable")--.

UNITED STATES PATENT AND TRADEMARK OFFICE
CERTIFICATE OF CORRECTION

PATENT NO. : 7,227,865 B2
APPLICATION NO. : 10/217692
DATED : June 5, 2007
INVENTOR(S) : Shaheen et al.

It is certified that error appears in the above-identified patent and that said Letters Patent is hereby corrected as shown below:

At FIG. 10, 4th boxed element from top, after "proxy-tag", delete "("RSVP Proxy Prefered" "RSVP Proxy Not Prefered")" and insert therefor --("RSVP Proxy Preferred" "RSVP Proxy Not Preferred")--.

At FIG. 10, 6th line from top, delete "Qos" and insert therefor --QoS--.

At FIG. 13, element 50, after the word "capable", delete "RSVP Proxy Not Prefered", and insert therefor --RSVP Proxy Not Preferred--.

At column 2, line 60, before the words "the RSVP", delete "instantiate" and insert therefor --initiate--.

At column 4, line 40, after the words "of a", delete "UNITS" and insert therefor --UMTS--.

At column 5, line 13, after "S-CSCF", delete "and".

At column 5, line 36, after the words "at step", delete "S1" and insert therefor --S11--.

At column 5, line 41, delete "(more information need here) resulting" and insert therefore -- results--.

At column 7, line 1, after the words "that the", delete "determinating" and insert therefor --determining--.

At column 7, line 44, before the word "continue", delete "should or stop" and insert therefor --should stop or--.

At column 7, line 53, before the words "on the", insert --parameters--.

At column 9, line 8, before the word "offered", delete "maybe" and insert therefor --may be--.

At column 11, line 2, after the word "flow", delete "than" and insert therefor --then--.

At column 11, line 8, before the word "message", delete ""final SDP" and insert therefor --"final SDP"--.

UNITED STATES PATENT AND TRADEMARK OFFICE
CERTIFICATE OF CORRECTION

PATENT NO. : 7,227,865 B2
APPLICATION NO. : 10/217692
DATED : June 5, 2007
INVENTOR(S) : Shaheen et al.

It is certified that error appears in the above-identified patent and that said Letters Patent is hereby corrected as shown below:

At claim 16, column 12, line 48, after the word "between", delete "a" and insert therefor --an--.

Signed and Sealed this

Eleventh Day of December, 2007

JON W. DUDAS
*Director of the United States Patent and Trademark Office*